(12) United States Patent
Shyamalan

(10) Patent No.: US 11,757,900 B2
(45) Date of Patent: Sep. 12, 2023

(54) SECURELY VERIFYING PROTECTED DEVICES

(71) Applicant: Verizon Patent and Licensing Inc., Basking Ridge, NJ (US)

(72) Inventor: Shyam T. Shyamalan, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 199 days.

(21) Appl. No.: 17/380,368

(22) Filed: Jul. 20, 2021

(65) Prior Publication Data

US 2023/0024751 A1  Jan. 26, 2023

(51) Int. Cl.
*H04L 9/40*  (2022.01)

(52) U.S. Cl.
CPC .......... *H04L 63/123* (2013.01); *H04L 63/0838* (2013.01); *H04L 63/102* (2013.01); *H04L 63/18* (2013.01); *H04L 63/20* (2013.01)

(58) Field of Classification Search
CPC ... H04L 63/123; H04L 63/0838; H04L 63/102; H04L 63/18; H04L 63/20
See application file for complete search history.

(56) References Cited

U.S. PATENT DOCUMENTS 11,282,053 B1\*  3/2022  Dennis et al. ........ G06Q 20/102
2022/0078184 A1\*  3/2022  Traynor et al. ...... H04L 63/166

FOREIGN PATENT DOCUMENTS

JP        2005209199 A \*  8/2005 ................. H04L 29/06
KR         101358375 B1\*  2/2014 ................... H04L 9/32

\* cited by examiner

*Primary Examiner* — Shawnchoy Rahman

(57) ABSTRACT

One or more computing devices, systems, and/or methods for securely verifying devices such as protected are provided. A code may be generated for a first device. A short message service (SMS) message comprising the code may be transmitted to the first device at a mobile directory number of the first device. An entry may be created to associate the code with the mobile directory number. A determination may be made as to whether a first code within a message associated with the mobile directory number matches the code within the entry. In response to a match, the message may be processed and a status of the first device may be marked as valid, otherwise, the message may be rejected.

20 Claims, 9 Drawing Sheets

US 11,757,900 B2

1

SECURELY VERIFYING PROTECTED DEVICES

BACKGROUND

There are many types of protected devices whose communication capabilities are constrained based upon various security policies. In an example, a protected device may comprise a wearable device that may be worn by a child. A security policy may be implemented for the wearable device such that only certain registered devices such as a parent or guardian's phone are allowed to communicate with the wearable device. Communication from non-registered devices to the wearable device and communication from the wearable device to non-registered devices may be blocked. In this way, safe and secure communication may be provided between protected devices and registered devices that are registered and authorized to communicate with the protected devices.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
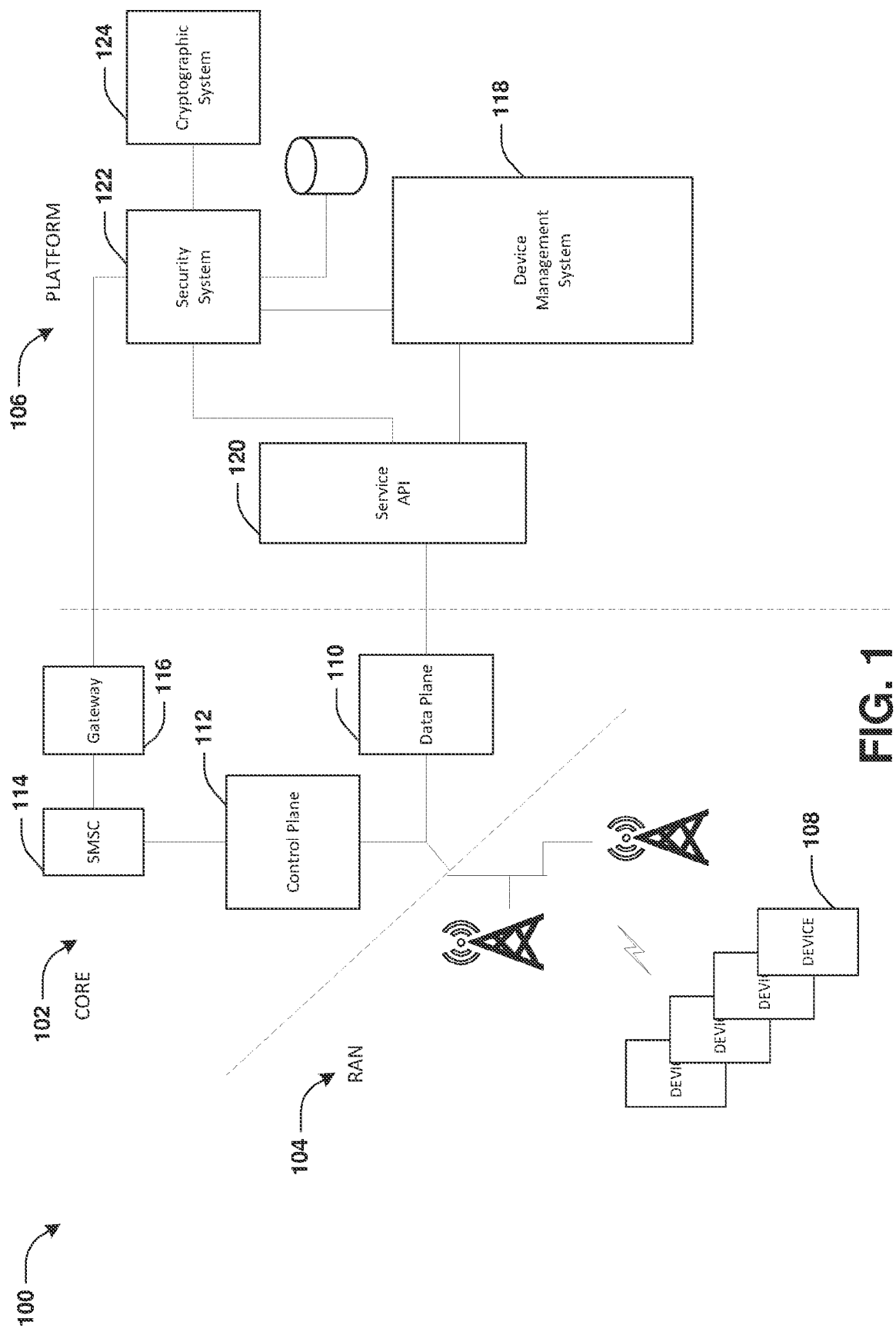
FIG. 1 is a diagram illustrating an example scenario associated with securely verifying protected devices

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

2

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for securely verifying protected device are provided. A platform may be configured to facilitate secure communication between protected devices and registered devices that are registered to communicate with the protected devices. In an example of configuring a relationship between a device and a protected device in order to register the device for communication with the protected device, a user of the device may create an account with the platform. For example, a parent may download a protected device management application on a mobile phone of the parent. The parent may utilize the protected device management application to create the account with the platform. As part of creating the account, the parent may pair the protected device such as a children's watch with the mobile phone of the parent. In this way, the parent may utilize the mobile phone to securely call, send messages to, and/or monitor the watch. Similarly, a user of the watch may securely call and send messages to the mobile phone of the parent. The platform may implement various security policies, authentication mechanism, and/or other functionality to constrain communication of the watch so that the watch can only receive communication from registered devices and the watch can only communicate back with these registered devices. The platform may provide such functionality for various types of protected devices, such as children's watches, elderly monitoring devices, pet tracking devices, devices used to track items such as keys, etc.

Even though the platform implements various authentication and security mechanisms to ensure that there is no unauthorized communication with protected devices, a malicious entity may gain access to a protected device. Once the malicious entity gains access to the protected device, the malicious entity could obtain access to an initial token used by the protected device to authenticate and communicate with the platform. Because the token may be exchanged over a data communication channel such as a data plane (e.g., the token is used to access a URL of the platform over the data communication channel), the malicious entity may be able to hack into the data communication channel in order to intercept the token being exchanged between the compromised protected device and the platform. With the token, the malicious entity could spoof the protected device, and thus gain unauthorized access to the platform.

Accordingly, as provided herein, protected devices may be securely verified in order to ensure that the protected devices have not been compromised and/or spoofed, thus improving the security of the platform, protected devices, and registered devices. In particular, a security system 122 and cryptographic system 124 are implemented for a platform 106 in order to securely verify devices, such as protected device (e.g., wearable devices, mobile devices, cellular phones, smart devices, unprotected devices, internet of things (IoT) devices, and/or other types of user equipment), as illustrated by FIG. 1.

The platform 106 may implement a device management system 118 used to manage and facilitate communication between devices 108, such as protected devices and registered devices. The device management system 118 may exchange information with the devices 108 through a service API 120 of the platform 106. For example, the devices 108 may connect to a radio access network (RAN) 104 in order to exchange information over a data plane 110 (e.g., a data communication channel) of a core network 102 through the service API 120 to the device management system 118. The devices 108 may also communicate over a control plane 112 through a short message service center 114 and a short message service gateway 116 of the core network 102 in order to communicate with the device management system 118.

The device management system 118 may be configured to facilitate communication between protected devices and registered devices. For example, one or more of the devices 108 may register through the service API 120 with the device management system 118 as registered devices that are allowed to communicate with a protected device of the devices 108. The device management system 118 may implement various functionality and/or security polices such that only the registered devices may communicate with the protected device and the protected device may only communicate with the registered devices. However, if a malicious entity obtains access to the protected device, then the malicious entity may hack into the data plane 110 in order to obtain an initial token used by the protected device to communicate with the device management system 118. Thus, the malicious entity could spoof the protected device and gain unauthorized access to the device management system 118.

Accordingly, the security system 122 may be configured to securely verify the protected device to ensure that the protected device is not being spoofed and/or is not compromised. For example, the security system 122 may invoke the cryptographic system 124 to periodically (e.g., every 10 minutes or any other timeframe) generate codes for the protected device that may be valid for a particular timeframe (e.g., 10 minutes). A code may comprises a token, a secret key, a randomly generated string, etc. The code is not provided over the data plane 110 to the protected device because a malicious entity spoofing the protected device may be able intercept the code, and thus gain unauthorized access to the device management system 118 of the platform 106. Instead, the security system 122 sends the code in an SMS message through the short message service center 114 and the short message service gateway 116 of the core network 102 over the control plane 112 to the protected device at a mobile directory number of the protected device. This ensures that a malicious entity attempting to spoof the protected device cannot receive or intercept the code because only the protected device with the mobile directory number is able to receive the code since the code was sent through the SMS message. That is, an SMS message directed to a mobile directory number can only be received by a device with that mobile directory number and cannot be intercepted by attempts to spoof the protected device because the SMS message is transmitted over a control plane 112 (e.g., a secure network owned by a communication service provider). Thus, a malicious entity cannot obtain the code through spoofing attempts of the protected device.

Before expiration of a validity end time of the timeframe during which the code is valid, the security system 122 will compare codes within messages associated with the mobile directory number of the protected device to determine whether the codes match the code transmitted to the protected device through the SMS message over the control plane 112 of the core network 102. If a code within a message matches the code sent through the SMS message to the protected device, then the protected device is validated. Accordingly, the message may be processed by the device management system 118 and a status of the protected device is marked as valid. If the codes do not match, then the message is rejected and/or the status of the protected device is marked as invalid. If codes within messages associated with the mobile directory number do not match a threshold number of times, then the protected device may be blocked from accessing the platform 106. In this way, the protected device may be securely validated and the device management system 118 of the platform 106 is protected against spoofing attacks and/or other unauthorized access from compromised devices.

Figure 2:
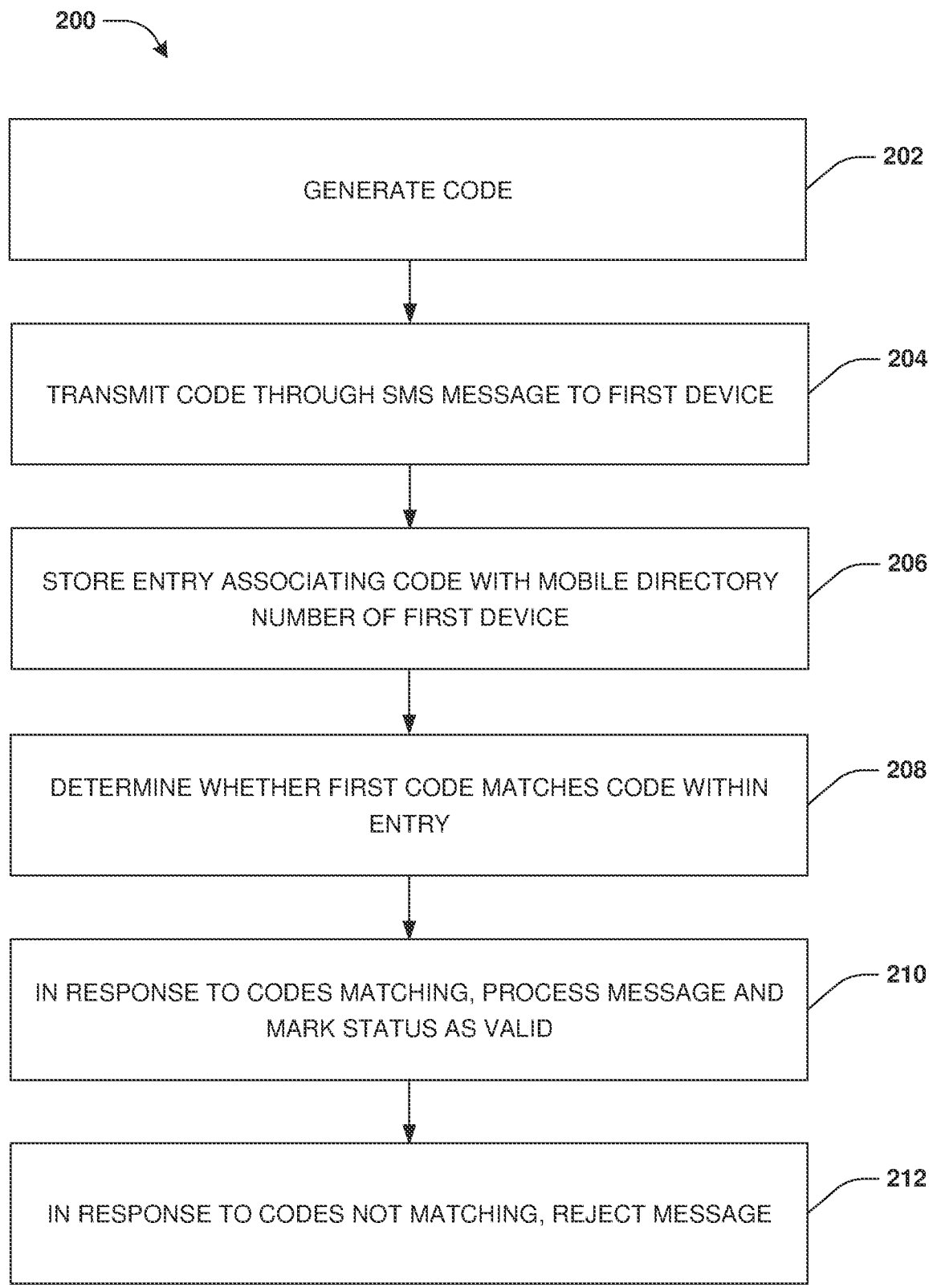
FIG. 2 is a flow chart illustrating an example method for securely verifying protected devices, where a platform provides a code to a device through a short message service (SMS) message.
Figure 3:
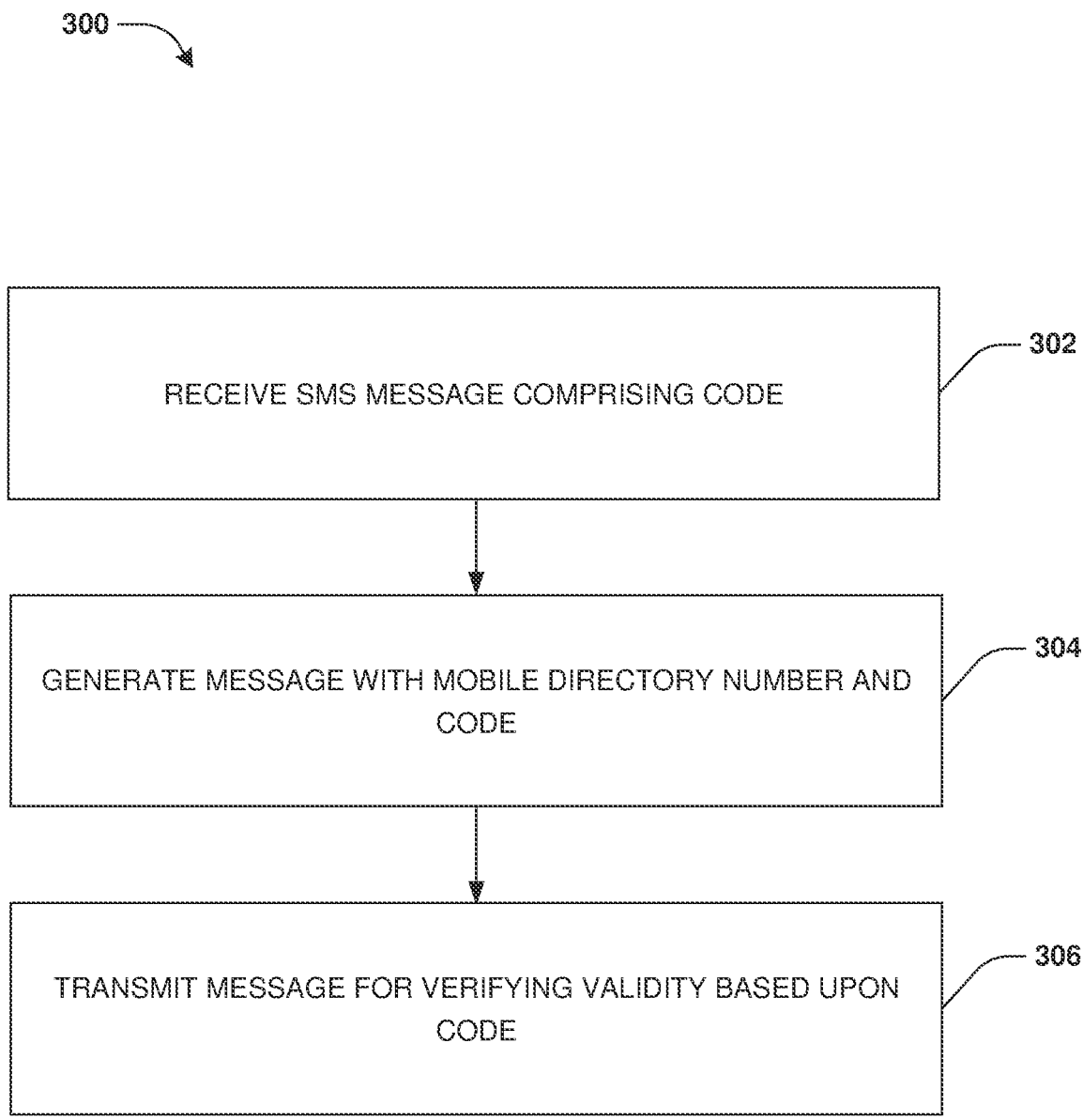
FIG. 3 is a flow chart illustrating an example method for securely verifying protected devices, where a device provides a code to a platform through a message.
Figure 4:
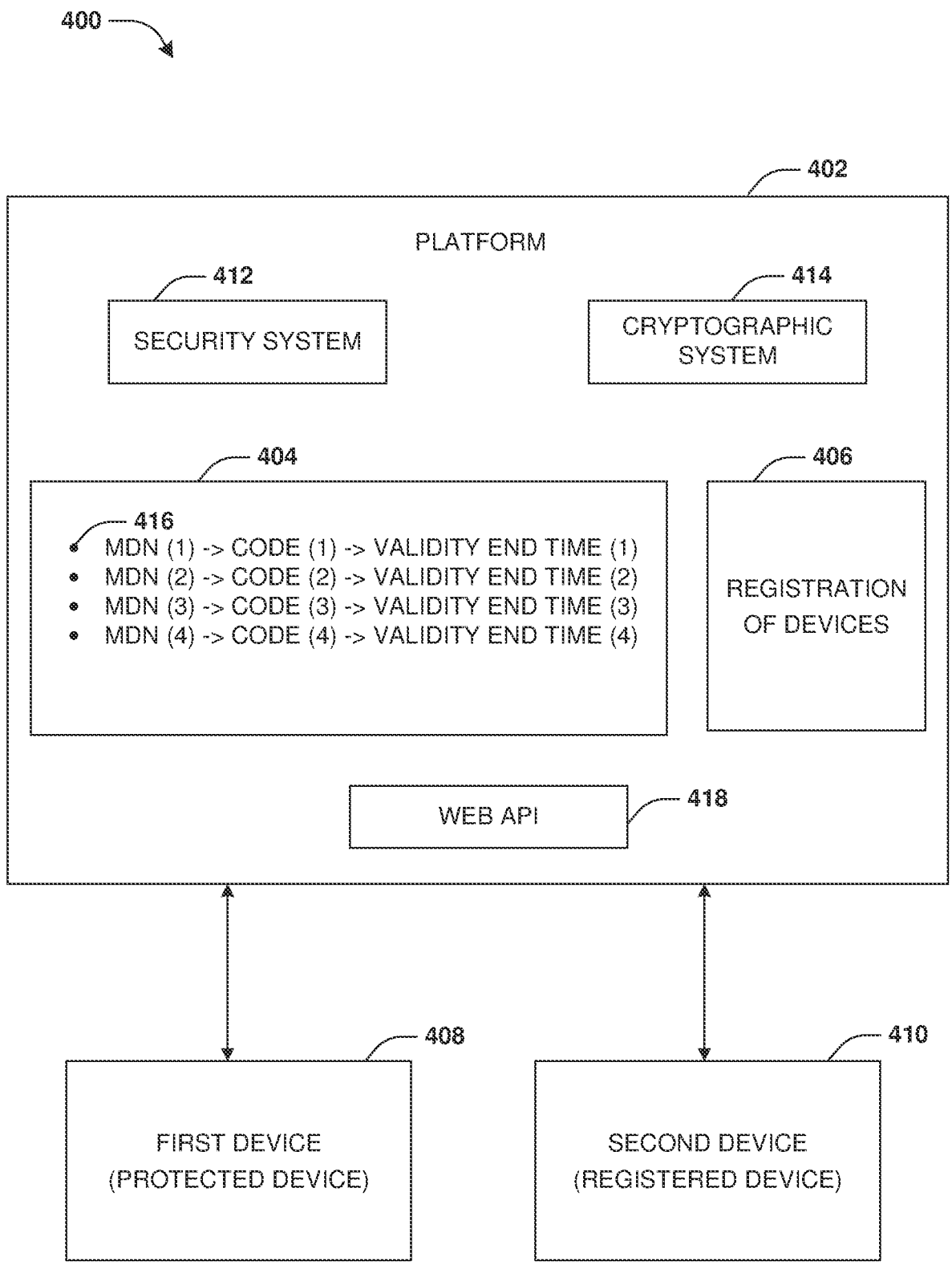
FIG. 4 is a diagram illustrating an example scenario associated with securely verifying protected devices.

Embodiments of securely verifying a protected device are illustrated by an exemplary method 200 of FIG. 2 and an exemplary method 300 of FIG. 3, which are further described in conjunction with system 400 of FIG. 4. The method 200 of FIG. 2 corresponds to operations performed by a platform 402 (e.g., platform 106 of FIG. 1) and method 300 of FIG. 3 corresponds to operations performed by a first device 408 such as a protected device. The platform 402 may be configured to authenticate and/or facilitate communication between devices such as protected devices and registered devices that are registered to communicate with the protected devices. For example, a first device 408 may comprise a protected device that is restricted from communicating with devices that are not registered and/or authenticated through the platform 402 as authorized for communication with the first device 408. A second device 410 may be a registered device that has been registered through the platform 402 for secure communication with the first device 408. For example, the first device 408 may comprise a children's watch that has been paired with the second device 410 such as a parent's smart phone. In this way, the platform 402 may maintain a registration of devices 406 in order to track what registered devices are registered to communicate with particular protected devices.

The platform 402 may track statuses of protected devices through the registration of devices 406. For example, a protected device may have a status set to valid if the protected device is deemed to be valid using the techniques provided herein, such as where the protected device is not experiencing a spoofing attack and can successfully validate a code provided by the platform to 402 to the protected device. Thus, communication between the protected device and registered devices that are registered to communicate with the protected device may be allowed. The status for the protected device may be set to invalid if the protected device is deemed to be invalid using the techniques provided herein, such as where the protected device may be experiencing a spoofing attack and there are one or more failed attempts to validate a code provided by the platform to 402 to the protected device.

A security system 412 and cryptographic system 414 are implemented for the platform 402 in order to securely verify protected devices. The security system 412 utilizes the cryptographic system 414 to generate codes that are transmitted through SMS messages to the protected devices in order to verify that the protected devices are not being spoofed and can provide the codes back to the security system 412. Accordingly, during operation 202 of method 200, a code is generated by the cryptographic system 414 of the platform 402 for the first device 408. The code may comprise a token, a secure key, a randomly generate string, or any other type of code. During operation 204 of method 200, the code may be transmitted through an SMS message by the security system 412. In particular, the SMS message may comprise the code and targets a mobile directory number of the first device 408. The SMS message is transmitted through a short message service gateway and a short message service center over a control plane of a core network for delivery to the first device 408 assigned the mobile directory number. In some embodiments, the code is not transmitted over a data plane that may be susceptible to hacking where a malicious entity could intercept the code. In contrast, the SMS message is directed to the mobile device number of the first device 408 and is routed through the control plane 112 (e.g., a network of a communication service provider such as a cellular provider), and thus cannot be intercepted by a different device that is not assigned the mobile device number.

The security system 412 of the platform 402 may specify a validity end time for the code. The validity end time may correspond to a timespan during which the code is valid, such as where the validity end time specifies a particular time after which the code becomes invalid. If a message is received from the protected device by the security system 412 of the platform 402 with a code that matches the code before expiration of the validity end time, then the protected device may be verified and marked as valid. If a message is received from the protected device by the security system 412 of the platform 402 after expiration of the validity end time and with a code that matches the code, then the protected device is not verified. The validity end time may correspond to any timespan, such as 10 minutes, 15 minutes, etc. Once the validity end time has expired, the code becomes invalid and/or is deleted. A new code may be generated for the protected device in place of the invalid code, and is provided to the protected device for verifying the validity of the protected device.

During operation 206 of method 200, the security system 412 of the platform 402 may create an entry 416 associating the code with the mobile directory number of the first device 408. The validity end time of the code may also be stored within the entry 416. The entry 416 may be associated with a status that may be set to either a confirmed status or an unconfirmed status. If the protected device has not yet responded with a message comprising a code that matches the code in the entry 416, then the status may be set to an unconfirmed status. Once the protected device has responded with a message comprising a code that matches the code in the entry 416, then the status may be set to a confirmed status. In this way, the security system 412 can use the entry 416 to track the code was provided to the protected device, whether the protected device has been confirmed by providing back a matching code, and when the code becomes invalid based upon expiration of the validity end time stored within the entry 416. In some embodiments, the entry 416 may be deleted in response to the validity end time expiring. Accordingly, a new entry may be created to replace the entry 416. The new entry may specify the mobile device number of the protected device, a new code generated for the protected device, and/or a new validity end time for the new code.

In some embodiments, a plurality of entries, associating mobile directory numbers of protected devices with codes for the protected devices and validity end times of the codes, may be stored within a data structure 404. The data structure 404 may be periodically scanned to identify entries that comprise validity end times that have expired. If an entry has a validity end time that has expired, then the entry may be removed from the data structure 404. If the entry also has an unconfirmed status, then a protected device with a mobile directory number associated with the entry may be marked as invalid because the protected device did not respond with a matching code before the validity end time expired. If the entry has a confirmed status, then the status of the protected device is not modified.

Once the platform 402 has transmitted the SMS message to the mobile directory number of the first device 408, the first device 408 may receive the SMS message, during operation 302 of method 300. The SMS message may comprise the code generated by the cryptographic system 414 for the first device 408. Because the code is sent through the SMS message to the mobile device number of the first device 408 (e.g., the SMS message is transmitted through a short message service gateway and a short message service center over a control plane of a core network, as opposed to over a data plane), only the first device 408 can receive the SMS message and other malicious entities cannot intercept the code. The first device 408 can determine and verify that the code came from the platform 402 such as from a device management system based upon an evaluation of a short code from which the SMS message was sent.

During operation 304 of method 300, the first device 408 may generate a message for transmission to a web application programming interface 418 (e.g., transmission over data plane 110 to service API 120) associated with the platform 402. The code received through the SMS message by the first device 408 and/or the mobile directory number of the first device 408 may be included within the message. In some embodiments, the message may correspond to an HTTP call that is sent as a POST message to the web API 418 at a website address. In some embodiments, the POST message may comprise a JSON payload with the code and the mobile directory number of the first device 408. During operation 306 of method 300, the first device 408 may transmit the message to the web API 418 before expiration of the validity end time for verifying the validity of the first device 408 based upon the code within the message matching the code within the SMS message.

Once the first device 408 has transmitted the message with the code, the message may be routed to the security system 412 of the platform 402. During operation 208 of method 200, the security system 412 of the platform 402 may determine whether the code within the message matches the code within the entry 416 associated with the mobile directory number. In particular, the security system 412 may evaluate the message in order to identify the mobile directory number specified through the message. The security system 412 may query the data structure 404 to identify the entry 416 corresponding to the mobile directory number of the first device 408. The security system 412 may compare the code within the message from the first device 408 to the code within the entry 416 associated with the mobile directory number of the first device 408.

In response to the code within the message matching the code within the entry 416, the message may be processed by the platform 402 and a status of the first device 408 may be marked as valid, during operation 210 of method 200. When the status of the first device 408 is valid, the platform 402 may authenticate communication between the first device 408 as a protected device and one or more registered devices, such as the second device 410, which are registered to communicate with the first device 408. In this way, communication between the first device 408 and the second device 410 may be facilitated based upon the validity of the first device 408 being verified. Furthermore, in response to the code within the message matching the code within the entry 416, the entry 416 may be marked as confirmed with a confirmed status.

In response to the code within the message not matching the code within the entry 416, the message may be rejected, during operation 212 of method 200. In some embodiments, in response to the code within the message not matching the code within the entry 416, a status of the entry 416 may remain as unconfirmed. In some embodiments, in response to the code within the message not matching the code within the entry 416, a status of the first device 408 may be marked as invalid with an invalid status. In some embodiments, in response to the code within the message not matching the code within the entry 416, the status of the first device 408 may be set to invalid and the first device 408 may be blocked from accessing some or all of the services of the platform 402 (such as connections to the second device 410). In some embodiments, the first device 408 is blocked from accessing the platform 402 after a threshold number of failed attempts to match the code within the entry 416 with codes transmitted to the platform 402 through messages associated with the mobile directory number. In some embodiments, communication is blocked between the first device 408 and the second device 410 and/or other registered devices registered to communicate with the first device 408 in response to the status of the first device 408 being set to invalid.

In some embodiments, in response to the code within the message not matching the code within the entry 416, the security system 412 may utilize the cryptographic system 414 to generate a new code that is sent through a new SMS message to the first device 408. A new entry with the new code for the mobile directory number of the first device 408 and with a new validity end time may be created within the data structure 404 to replace the entry 416.

In some embodiments, in response to the code within the message not matching the code within the entry 416, a notification may be transmitted to the second device 410 and/or to other registered devices registered to communicate with the first device 408. The notification may describe the problem where the first device 408 was marked as invalid and may describe a resolution action to perform in order to resolve the problem, such as instructions to re-pair and/or re-register the first device 408 and the second device 410.

In some embodiments, in response to the message being received after expiration of the validity end time and the code within the message matching the code within the entry 416, the message may be rejected and/or the status of the first device 408 may be marked as invalid.

If the message is rejected, then a rejection response for the message may be transmitted to the first device 408. In response to receiving the rejection response, the first device 408 may submit a request to the platform 402 for a new code.

In this way, security of the platform 402 is improved by verifying the validity of protected devices in order to protect the platform 402 from spoof attacks of malicious entities attempting to impersonate the first device 408.

Figure 5:
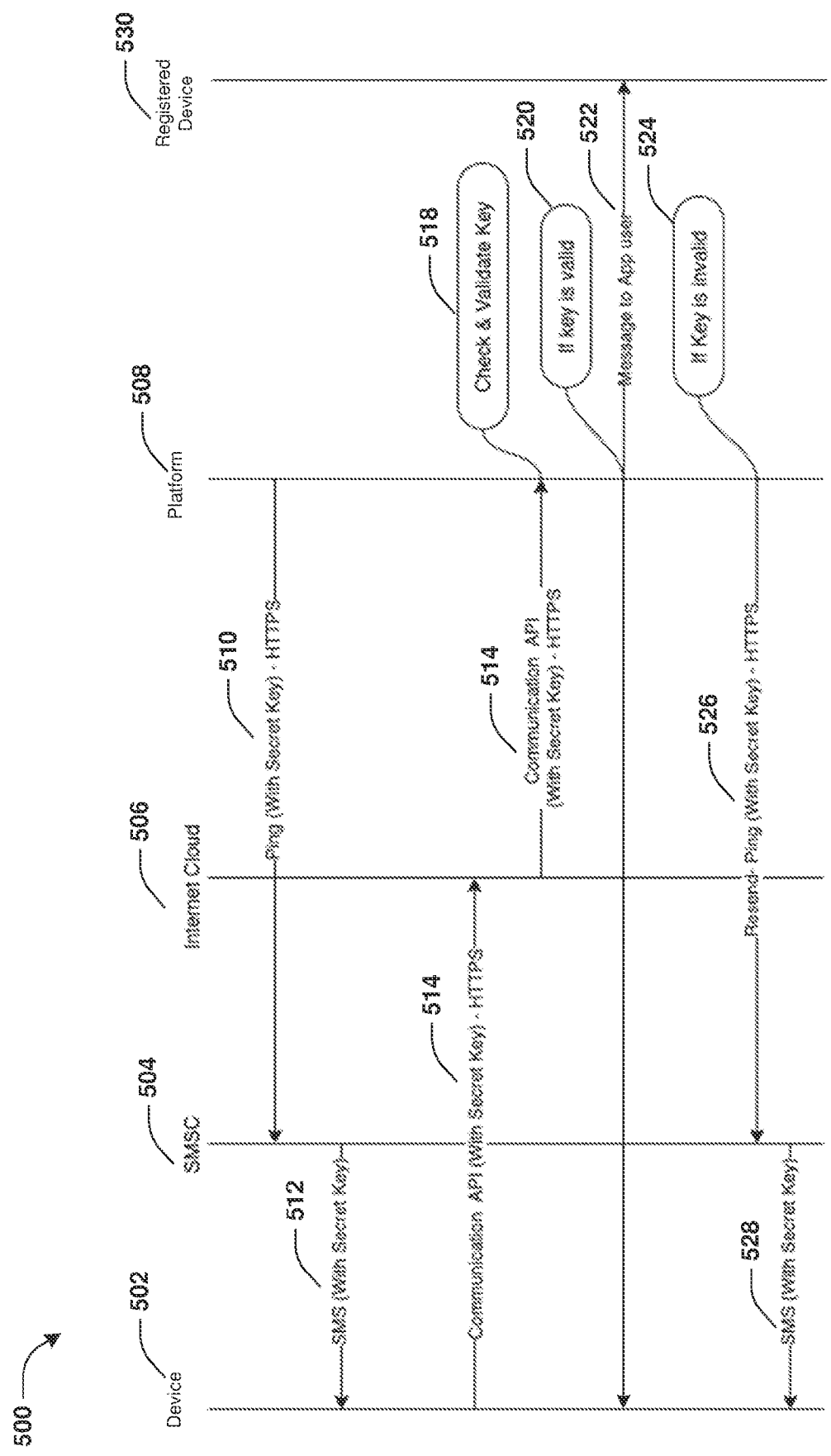
FIG. 5 is a flow chart illustrating an example method for securely verifying protected devices.

FIG. 5 illustrates a method 500 of verifying the validity of a device 502 (e.g., an internet of things IoT device, a protected device, an unprotected device, etc.) for communication with a registered device 530. A platform 508 may generate a code as a secret key. The platform 508 may associate the secret key with a mobile directory number of the device 502. The platform 508 may transmit a ping message 510 comprising the secret key through an internet cloud 506 over HTTPS to a short message service center 504. The short message service center 504 may transmit an SMS message 512 with the secret key to the device 502.

In response to receiving the SMS message 512 from the short message service center 504, the device 502 may transmit a communication message 514 with the secret key through the internet cloud 506 over HTTPS to a web API associated with the platform 508. Once the platform 508 receives the communication message 514 with the secret key, the platform 508 performs a validity check 518 to determine whether the secret key within the communication message 514 matches the secret key that was transmitted to the device 502 through the SMS message 512. If the keys match 520, then the communication message 514 is processed. For example, communication between the device 502 and the registered device 530 is exchanged 522 based upon the keys matching 520. If the keys do not match 524, then the communication message 514 is rejected and a new message 526 comprising the secret key (or a new secret key) is transmitted from the platform 508 through the internet cloud 506 over HTTPS to the short message service center 504. The short message service center 504 may transmit a new SMS message 528 with the secret key to the device 502 in order to attempt to verify the device 502.

Figure 6:
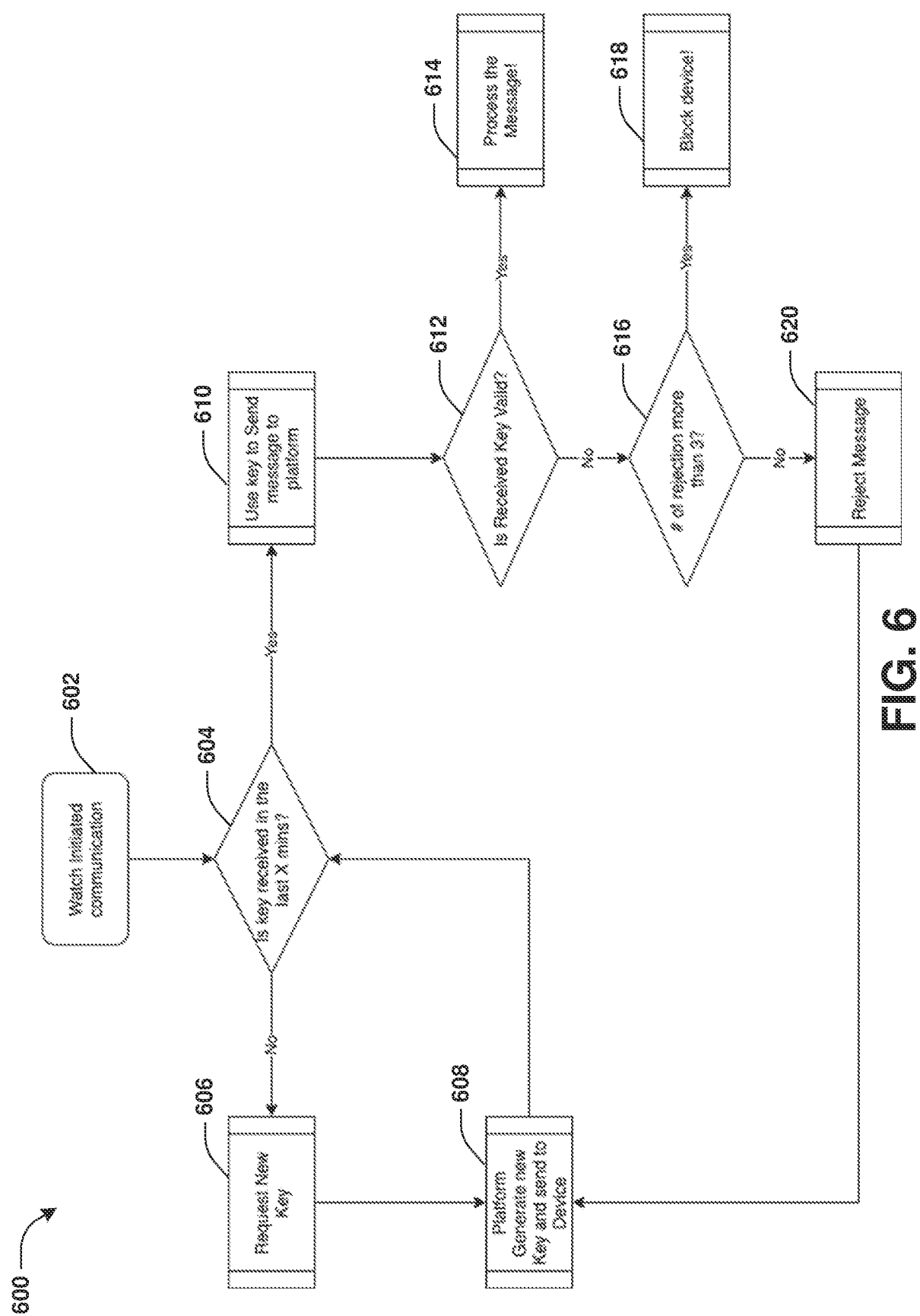
FIG. 6 is a flow chart illustrating an example method for securely verifying protected devices.

FIG. 6 illustrates a method 600 of verifying the validity of a device such as a watch that is a protected device. During operation 602, the watch may initiate communication, such as with a registered device through a platform configured to authenticate and facilitate communication between the watch and registered devices that are registered to communicate with the watch. During operation 604, a determination is made as to whether a key (e.g., code) received by the watch from the platform was received before expiration of a validity end time (e.g., received within the last 10 minutes). If the key was received after expiration of the validity end time, then a request is made by the watch to the platform for a new key, during operation 606. During operation 608, the platform may generate a new key and send the new key to the watch.

If the key was received before expiration of the validity end time, then the watch sends a message comprising the key to the platform, during operation 610. Once the platform receives the key, the platform determines whether the key is valid such that the key matches a key that the platform provided to the watch, during operation 612. If the key is validated where the key matches the key provided by the platform to the watch, then the message is processed, during operation 614. If the key is not validated where the key does not match the key provided by the platform to the watch and thus the message is rejected, then a determination is made as to whether a threshold number of rejections have been made (e.g., has more than 3 unsuccessful validations been performed), during operation 616. If more than the threshold number of rejections have been made, then the watch is blocked from accessing one or more services of the platform, during operation 618. If less than the threshold number of rejections have been made, then a rejection message is transmitted to the watch, during operation 620. If the rejection message is transmitted to the watch, then the platform may generate a new key that is provided to the watch, during operation 608.

In some embodiments, a protected device such as a watch may receive a code from a platform, such as through an SMS message. The protected device may send the code to an authentication API, such as an authentication API of the platform (e.g., a service API and/or a security system of the platform). The authentication API verifies the code by determining if the code from the protected device matches the code sent to the protected device through the SMS message. Upon verifying the code, the protected device is marked by the authentication API as being verified to send messages to a registered device. Each time the platform receives a message from the protected device (e.g., a message including an MDN of the protected device), the platform checks the device verification of the protected device. The platform allows transmission of communication between the protected device and the registered device if the protected device is verified. The platform rejects the communication between the protected device and the registered device if the protected device is unverified. The platform may also trigger the transmission of a new code through SMS if the protected device is unverified. The platform may periodically expire the validation for the protected device (e.g., after 10 minutes, after a specified time, etc.) and/or upon the sending of a new code through SMS, such that the protected device must periodically re-validate.

In some embodiments, a protected device such as a watch may receive a code from a platform, such as through an SMS message. The protected device sends the code within each data message that the protected device sends to the platform. The platform performs an authentication on the code received through a data message. If authentication fails, then the message is rejected and a new code is sent by the platform to the watch through SMS. In an example, each message may be separately authenticated directly using the code within each message.

Note that the examples described above may be used separately or in combination. For example, in some implementations, the protected device may use an authentication API to set a validation status at the platform, and the protected device may include the code in the data messages it sends to the platform for delivery to registered device(s). In other implementations, the protected device may use an authentication API to set a validation status at the platform, and the protected device may not include the code in the data messages it sends to the platform for delivery to registered device(s). In still other implementations, the protected device may not use an authentication API to set validation status at the platform, but rather includes the code in each data message it sends to the platform for delivery to registered device(s).

In some embodiments, a platform periodically generates a code (e.g., every 10 minutes) and sends the code to a protected device through SMS. As noted above, the protected device may include the code in every message sent by the protected device to the platform. In an example of including the code within a message, the code may be included as one or more objects that are part of a JSON payload of the message. For example, the code is included as part of a JSON object set that is part of the message send API call of the message to the platform. The platform compares the code from the protected device to the code that was previously sent to the device through SMS. If the codes match, then the protected device is authenticated. If the codes do not match, then the protected device is not validated and the message is rejected.

According to some embodiments, a method is provided. The method includes generating a code by a platform configured to authenticate communication between a protected device and a registered device registered to communicate with the protected device; transmitting a short message service (SMS) message through an SMS gateway from the platform to the protected device at a mobile directory number of the protected device; storing an entry associating the code with the mobile directory number; in response to receiving a message comprising the mobile directory number and a first code, determining whether the first code matches the code within the entry associated with the mobile directory number; in response to the first code matching the code, processing the message and marking a status of the protected device as valid; and in response to the first code not match the code, rejecting the message.

According to some embodiments, the method includes storing a validity end time for the code within the entry, wherein the validity end time corresponds to a timespan during which the code is valid.

According to some embodiments, the method includes in response to the message being received after expiration of the validity end time and the first code matching the code, rejecting the message and marking the status of the protected device as invalid.

According to some embodiments, the method includes in response to the validity end time expiring, generating a new code to associate with the mobile directory number through a new entry.

According to some embodiments, the method includes in response to the validity end time expiring, deleting the entry.

According to some embodiments, the method includes in response to the first code matching the code, marking the entry as confirmed.

According to some embodiments, the method includes maintaining a plurality of entries, associating mobility directory numbers of protected devices with codes and validity end times, within a data structure, wherein the plurality of entries comprise the entry; scanning the data structure to identify entries comprising validity end times that have expired; and in response to identifying one or more entries comprising expired validity end times, marking statuses of protected devices associated with the one or more entries comprising the expired validity end times as invalid based upon the one or more entries having unconfirmed statuses.

According to some embodiments, the method includes in response to determining that a threshold number of codes within messages associated with the mobile directory number do not match the code, blocking the protected device from accessing the platform.

According to some embodiments, the method includes in response to the first code not matching the code, marking the status of the protected device as invalid.

According to some embodiments, the method includes in response to the status being invalid, blocking the protected device from accessing the platform.

According to some embodiments, the method includes in response to the first code not matching the code, generating and sending a new code to the protected device through a new SMS message.

According to some embodiments, the method includes in response to the first code not matching the code, transmitting a notification to the registered device of a problem with authenticating the protected device and a resolution action to perform to resolve the problem.

According to some embodiments, wherein the protected device is restricted from communicating with devices that are not registered through the platform as authorized for communication with the protected device.

According to some embodiments, a system is provided. The system comprises a processor coupled to memory, the processor configured to execute instructions to perform operations. The operations include generating a code for a first device; transmitting a short message service (SMS) message comprising the code through an SMS gateway from a platform to the first device at a mobile directory number of the first device; storing an entry associating the code with the mobile directory number; in response to receiving a message comprising the mobile directory number and a first code, determining whether the first code matches the code within the entry associated with the mobile directory number; in response to the first code matching the code, processing the message and marking a status of the first device as valid; and in response to the first code not match the code, rejecting the message.

According to some embodiments, the operations include in response to the status of the first device being valid, authenticating, by the platform, communication between the first device and a second device registered for communication with the first device; and in response to the status of the first device being invalid, blocking communication between the first device and the second device.

According to some embodiments, the operations include storing a validity end time for the code within the entry, wherein the validity end time corresponds to a timespan during which the code is valid.

According to some embodiments, the operations include in response to the message being received after expiration of the validity end time and the first code matching the code, rejecting the message and marking the status of the first device as invalid.

According to some embodiments, a non-transitory computer-readable medium storing instructions that when executed facilitate performance of operations, is provided. The operations include receiving, by a protected device, a short message service (SMS) message generated by a platform configured to authenticate communication between the protected device and a registered device registered to communicate with the protected device, wherein the SMS message comprises a code associated with a validity end time corresponding to a timespan during which the code is valid; generating a message for transmission to a web application programming interface associated with the platform, wherein the message is generated to comprise a mobile directory number of the protected device and the code; and transmitting the message to the web application programming interface before expiration of the validity end time for verifying a validity of the protected device based upon the code within the message matching the code within the SMS message.

According to some embodiments, the operations include in response to receiving a rejection response for the message, transmitting a request to the platform for a new code.

According to some embodiments, the operations include facilitating, by the protected device, communication with the registered device based upon the validity of the protected device being verified.

Figure 7:
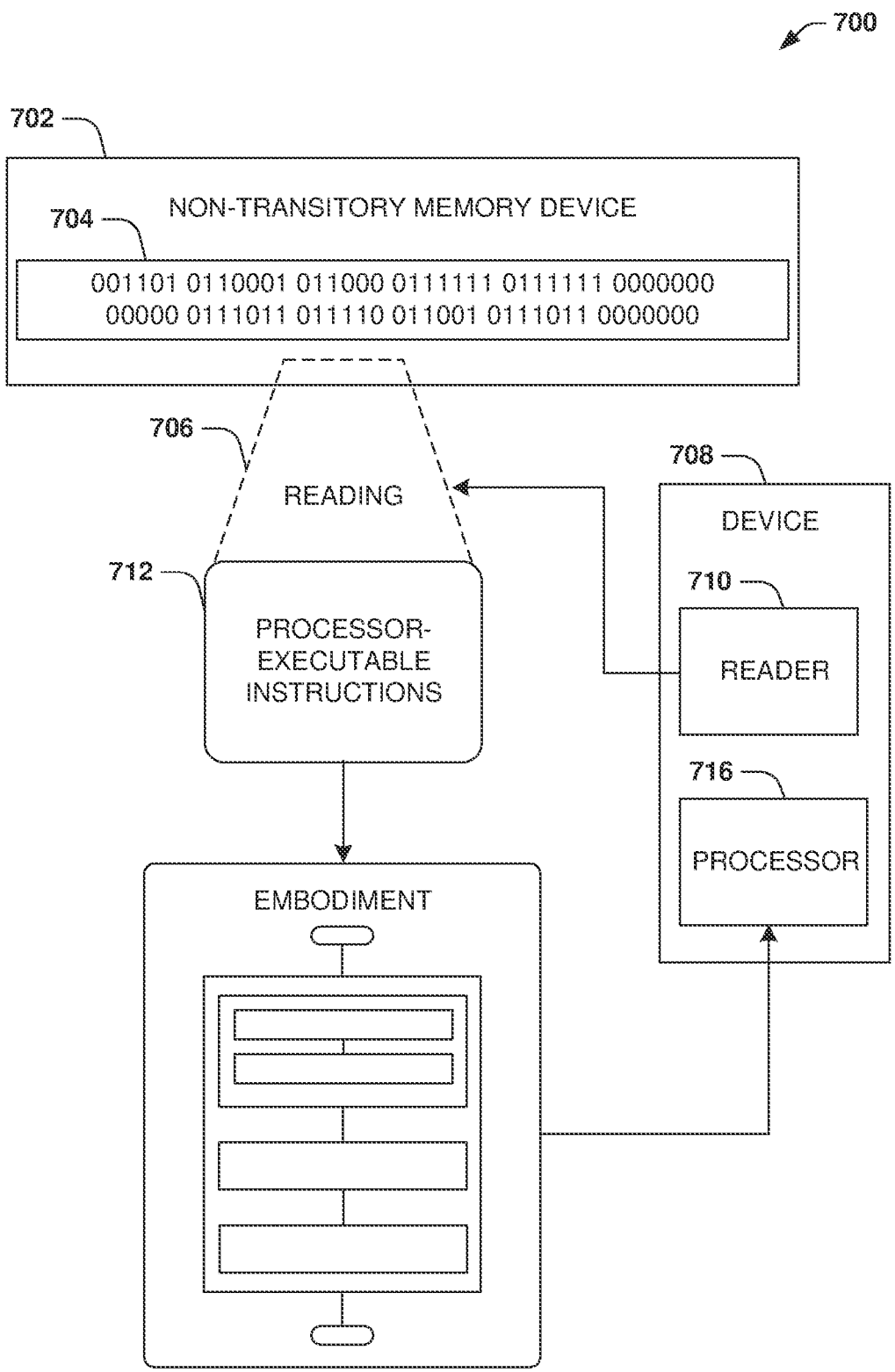
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein. The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed cause performance of operations, such as at least some of the example method 200 of FIG. 2, at least some of the example method 300 of FIG. 3, at least some of the example method 500 of FIG. 5, and/or at least some of the example method 600 of FIG. 6, for example. In some embodiments, the processor-executable instructions 712 are configured to cause implementation of a system, such as at least some of the example system 100 of FIG. 1 and/or at least some of the example system 400 of FIG. 4, for example.

Figure 8:
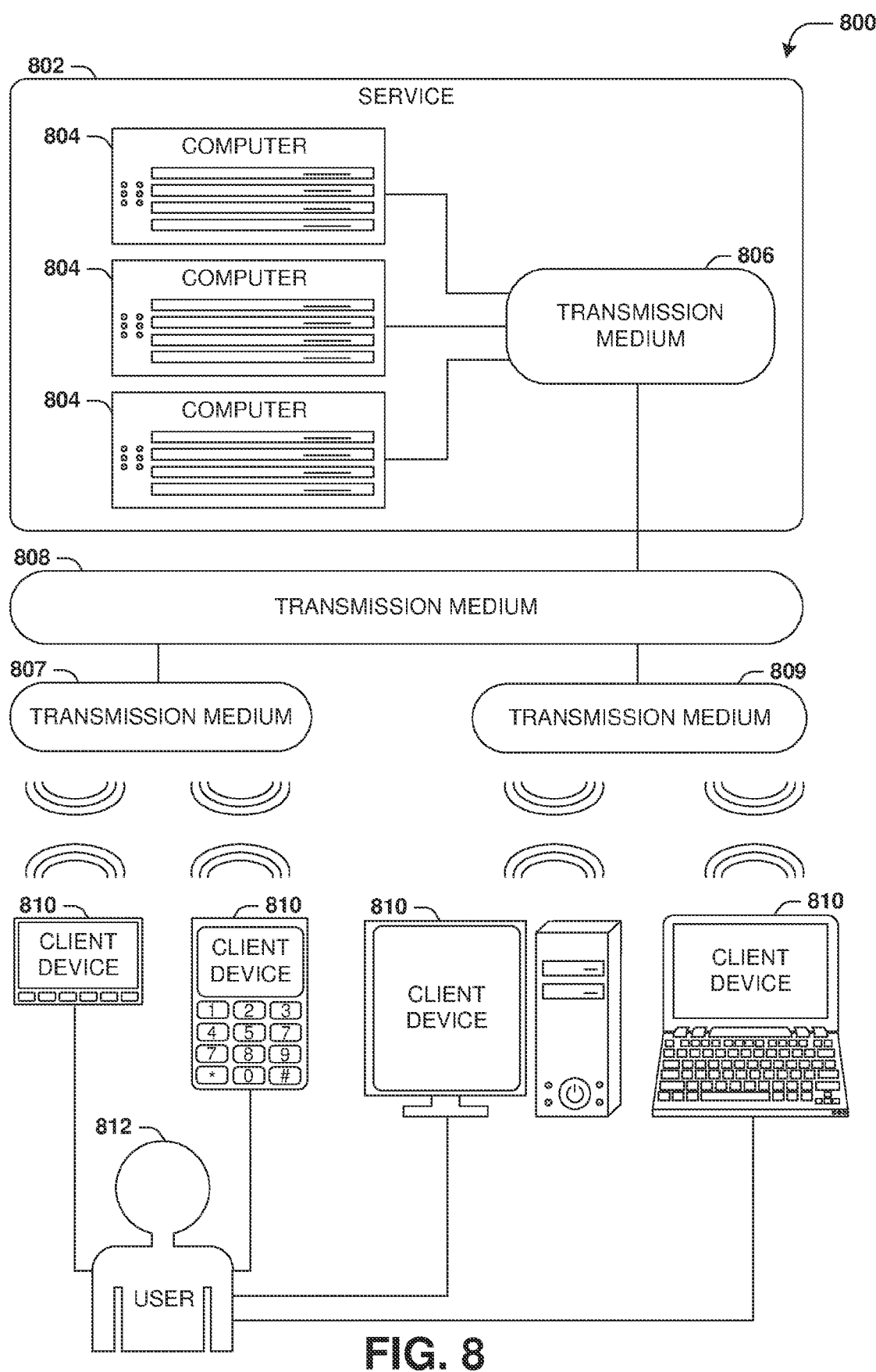
FIG. 8 is an illustration of example networks that may utilize and/or implement at least a portion of the techniques presented herein.

FIG. 8 is an interaction diagram of a scenario 800 illustrating a service 802 provided by a set of computers 804 to a set of client devices 810 via various types of transmission mediums. The computers 804 and/or client devices 810 may be capable of transmitting, receiving, processing, and/or storing many types of signals, such as in memory as physical memory states.

The computers 804 of the service 802 may be communicatively coupled together, such as for exchange of communications using a transmission medium 806. The transmission medium 806 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 802.

Likewise, the transmission medium 806 may comprise one or more sub-networks, such as may employ different architectures, may be compliant or compatible with differing protocols and/or may interoperate within the transmission medium 806. Additionally, various types of transmission medium 806 may be interconnected (e.g., a router may provide a link between otherwise separate and independent transmission medium 806).

In scenario 800 of FIG. 8, the transmission medium 806 of the service 802 is connected to a transmission medium 808 that allows the service 802 to exchange data with other services 802 and/or client devices 810. The transmission medium 808 may encompass various combinations of devices with varying levels of distribution and exposure, such as a public wide-area network and/or a private network (e.g., a virtual private network (VPN) of a distributed enterprise).

In the scenario 800 of FIG. 8, the service 802 may be accessed via the transmission medium 808 by a user 812 of one or more client devices 810, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 810 may communicate with the service 802 via various communicative couplings to the transmission medium 808. As a first such example, one or more client devices 810 may comprise a cellular communicator and may communicate with the service 802 by connecting to the transmission medium 808 via a transmission medium 807 provided by a cellular provider. As a second such example, one or more client devices 810 may communicate with the service 802 by connecting to the transmission medium 808 via a transmission medium 809 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 804 and the client devices 810 may communicate over various types of transmission mediums.

Figure 9:
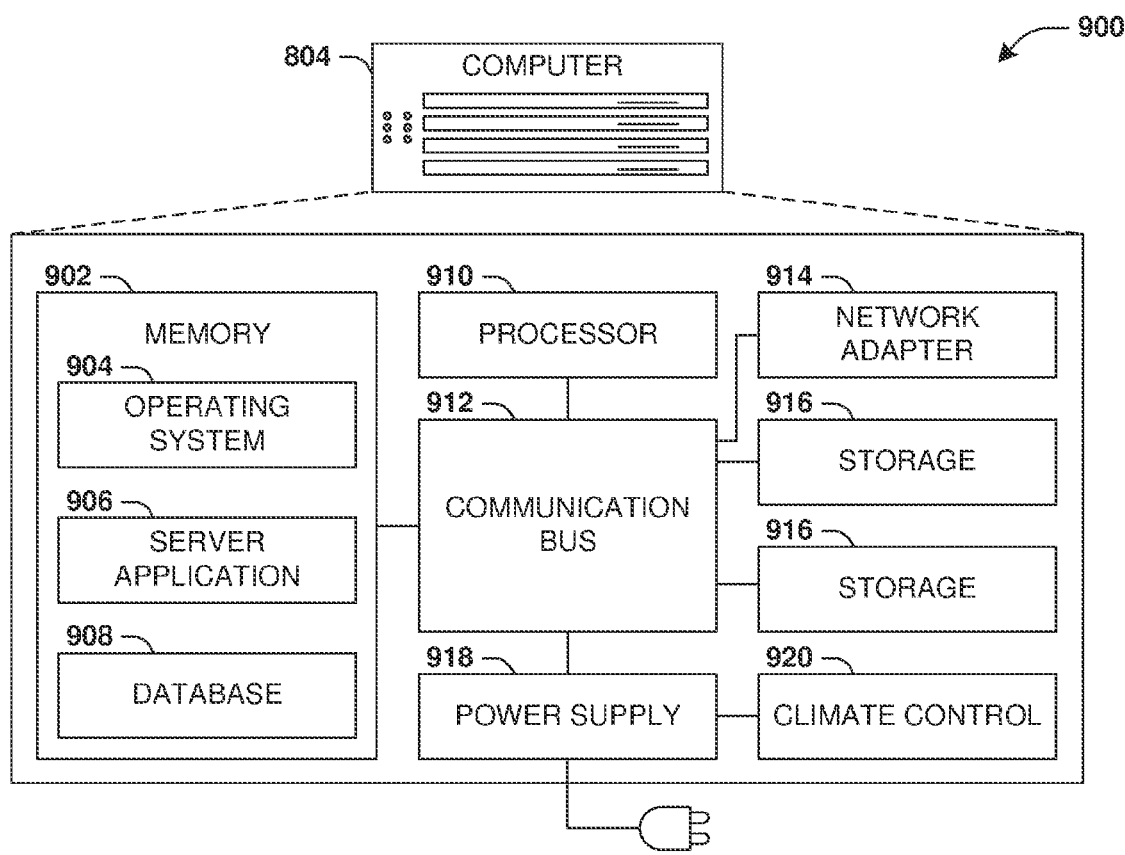
FIG. 9 is an illustration of a scenario involving an example configuration of a computer that may utilize and/or implement at least a portion of the techniques presented herein.

FIG. 9 presents a schematic architecture diagram 900 of a computer 804 that may utilize at least a portion of the techniques provided herein. Such a computer 804 may vary widely in configuration or capabilities, alone or in conjunction with other computers, in order to provide a service such as the service 802.

The computer 804 may comprise one or more processors 910 that process instructions. The one or more processors 910 may optionally include a plurality of cores; one or more coprocessors, such as a mathematics coprocessor or an integrated graphical processing unit (GPU); and/or one or more layers of local cache memory. The computer 804 may comprise memory 902 storing various forms of applications, such as an operating system 904; one or more computer applications 906; and/or various forms of data, such as a database 908 or a file system. The computer 804 may comprise a variety of peripheral components, such as a wired and/or wireless network adapter 914 connectible to a local area network and/or wide area network; one or more storage components 916, such as a hard disk drive, a solid-state storage device (SSD), a flash memory device, and/or a magnetic and/or optical disk reader.

The computer 804 may comprise a mainboard featuring one or more communication buses 912 that interconnect the processor 910, the memory 902, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 912 may interconnect the computer 804 with at least one other computer. Other components that may optionally be included with the computer 804 (though not shown in the schematic architecture diagram 900 of FIG. 9) include a display; a display adapter, such as a graphical processing unit (GPU); input peripherals, such as a keyboard and/or mouse; and a flash memory device that may store a basic input/output system (BIOS) routine that facilitates booting the computer 804 to a state of readiness.

The computer 804 may operate in various physical enclosures, such as a desktop or tower, and/or may be integrated with a display as an "all-in-one" device. The computer 804 may be mounted horizontally and/or in a cabinet or rack, and/or may simply comprise an interconnected set of components. The computer 804 may comprise a dedicated and/or shared power supply 918 that supplies and/or regulates power for the other components. The computer 804 may provide power to and/or receive power from another computer and/or other devices. The computer 804 may comprise a shared and/or dedicated climate control unit 920 that regulates climate properties, such as temperature, humidity, and/or airflow. Many such computers 804 may be configured and/or adapted to utilize at least a portion of the techniques presented herein.

Figure 10:
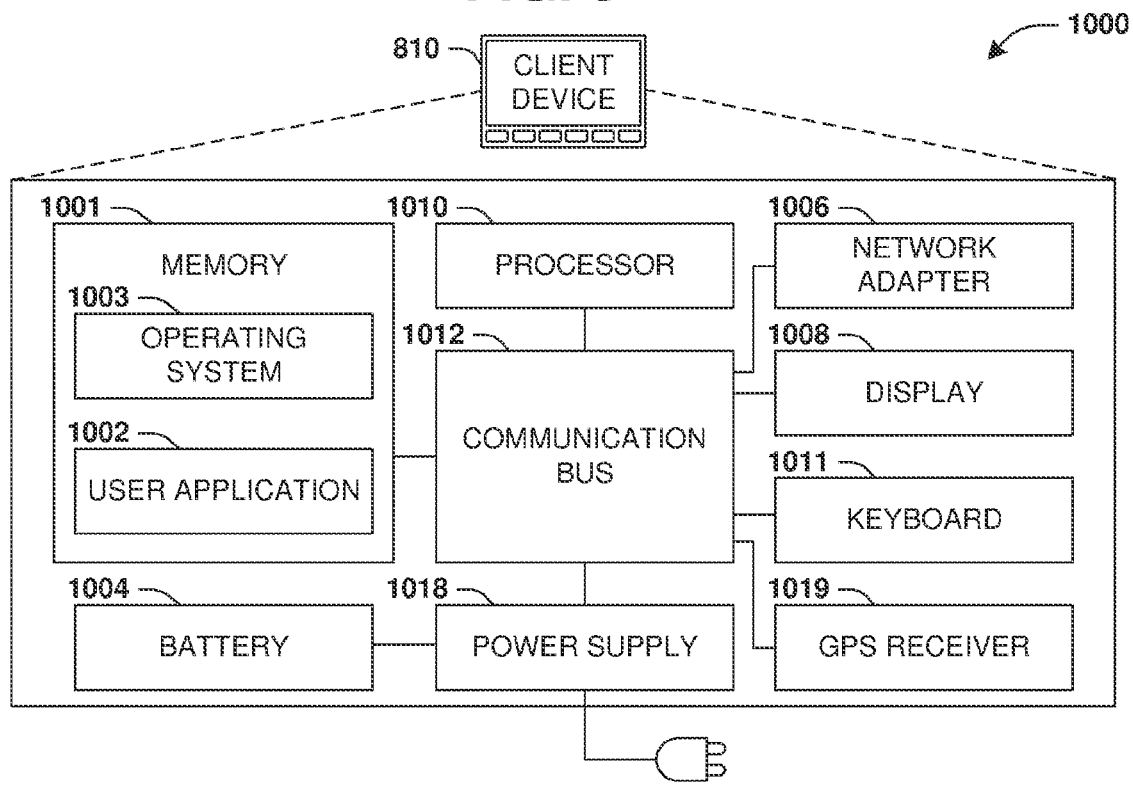
FIG. 10 is an illustration of a scenario involving an example configuration of a client that may utilize and/or implement at least a portion of the techniques presented herein.

FIG. 10 presents a schematic architecture diagram 1000 of a client device 810 whereupon at least a portion of the techniques presented herein may be implemented. Such a client device 810 may vary widely in configuration or capabilities, in order to provide a variety of functionality to a user such as the user 812. The client device 810 may be provided in a variety of form factors, such as a desktop or tower workstation; an "all-in-one" device integrated with a display 1008; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 810 may serve the user in a variety of roles, such as a workstation, kiosk, media player, gaming device, and/or appliance.

The client device 810 may comprise one or more processors 1010 that process instructions. The one or more processors 1010 may optionally include a plurality of cores; one or more coprocessors, such as a mathematics coprocessor or an integrated graphical processing unit (GPU); and/or one or more layers of local cache memory. The client device 810 may comprise memory 1001 storing various forms of applications, such as an operating system 1003; one or more user applications 1002, such as document applications, media applications, file and/or data access applications, communication applications such as web browsers and/or email clients, utilities, and/or games; and/or drivers for various peripherals. The client device 810 may comprise a variety of peripheral components, such as a wired and/or wireless network adapter 1006 connectible to a local area network and/or wide area network; one or more output components, such as a display 1008 coupled with a display adapter (optionally including a graphical processing unit (GPU)), a sound adapter coupled with a speaker, and/or a printer; input devices for receiving input from the user, such as a keyboard 1011, a mouse, a microphone, a camera, and/or a touch-sensitive component of the display 1008; and/or environmental sensors, such as a global positioning system (GPS) receiver 1019 that detects the location, velocity, and/or acceleration of the client device 810, a compass, accelerometer, and/or gyroscope that detects a physical orientation of the client device 810. Other components that may optionally be included with the client device 810 (though not shown in the schematic architecture diagram 1000 of FIG. 10) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 810 to a state of readiness; and a climate control unit that regulates climate properties, such as temperature, humidity, and airflow.

The client device 810 may comprise a mainboard featuring one or more communication buses 1012 that interconnect the processor 1010, the memory 1001, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 810 may comprise a dedicated and/or shared power supply 1018 that supplies and/or regulates power for other components, and/or a battery 1004 that stores power for use while the client device 810 is not connected to a power source via the power supply 1018. The client device 810 may provide power to and/or receive power from other client devices.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
    generating a code by a platform configured to authenticate communication between a protected device and a registered device registered to communicate with the protected device;
    transmitting a short message service (SMS) message through an SMS gateway from the platform to the protected device at a mobile directory number of the protected device;
    storing an entry associating the code with the mobile directory number;
    in response to receiving a message, comprising the mobile directory number and a first code, for validating the protected device with the platform, determining whether the first code matches the code within the entry associated with the mobile directory number;
    in response to the first code within the message matching the code, processing the message and marking a status of the protected device as valid; and
    in response to the first code within the message not match the code, rejecting the message.

2. The method of claim 1, comprising:
    storing a validity end time for the code within the entry, wherein the validity end time corresponds to a timespan during which the code is valid.

3. The method of claim 2, comprising:
    in response to the message being received after expiration of the validity end time and the first code matching the code, rejecting the message and marking the status of the protected device as invalid.

4. The method of claim 2, comprising:
    in response to the validity end time expiring, generating a new code to associate with the mobile directory number through a new entry.

5. The method of claim 2, comprising:
    in response to the validity end time expiring, deleting the entry.

6. The method of claim 1, comprising:
    in response to the first code matching the code, marking the entry as confirmed.

7. The method of claim 1, comprising:
    maintaining a plurality of entries, associating mobility directory numbers of protected devices with codes and validity end times, within a data structure, wherein the plurality of entries comprise the entry;

scanning the data structure to identify entries comprising validity end times that have expired; and in response to identifying one or more entries comprising expired validity end times, marking statuses of protected devices associated with the one or more entries comprising the expired validity end times as invalid based upon the one or more entries having unconfirmed statuses.

8. The method of claim 1, comprising
in response to determining that a threshold number of codes within messages associated with the mobile directory number do not match the code, blocking the protected device from accessing the platform.

9. The method of claim 1, comprising:
in response to the first code not matching the code, marking the status of the protected device as invalid.

10. The method of claim 9, comprising:
in response to the status being invalid, blocking the protected device from accessing the platform.

11. The method of claim 1, comprising:
in response to the first code not matching the code, generating and sending a new code to the protected device through a new SMS message.

12. The method of claim 1, comprising:
in response to the first code not matching the code, transmitting a notification to the registered device of a problem with authenticating the protected device and a resolution action to perform to resolve the problem.

13. The method of claim 1, wherein the protected device is restricted from communicating with devices that are not registered through the platform as authorized for communication with the protected device.

14. A system comprising:
a memory comprising instructions; and
a processor coupled to the memory, the processor configured to execute the instructions to facilitate performance of operations comprising:
generating a code for a first device;
transmitting a short message service (SMS) message comprising the code through an SMS gateway from a platform to the first device at a mobile directory number of the first device;
storing an entry associating the code with the mobile directory number;
in response to receiving a message, comprising the mobile directory number and a first code, for validating the first device with the platform, determining whether the first code matches the code within the entry associated with the mobile directory number;
in response to the first code matching the code, processing the message and marking a status of the first device as valid; and
in response to the first code not match the code, rejecting the message.

15. The system of claim 14, wherein the operations comprise:
in response to the status of the first device being valid, authenticating, by the platform, communication between the first device and a second device registered for communication with the first device; and
in response to the status of the first device being invalid, blocking communication between the first device and the second device.

16. The system of claim 14, wherein the operations comprise:
storing a validity end time for the code within the entry, wherein the validity end time corresponds to a timespan during which the code is valid.

17. The system of claim 16, wherein the operations comprise:
in response to the message being received after expiration of the validity end time and the first code matching the code, rejecting the message and marking the status of the first device as invalid.

18. A non-transitory computer-readable medium storing instructions that when executed facilitate performance of operations comprising:
receiving, by a protected device, a short message service (SMS) message generated by a platform configured to authenticate communication between the protected device and a registered device registered to communicate with the protected device, wherein the SMS message comprises a code associated with a validity end time corresponding to a timespan during which the code is valid;
generating a message for transmission to a web application programming interface associated with the platform for validating the protected device with the platform, wherein the message is generated to comprise a mobile directory number of the protected device and the code; and
transmitting the message to the web application programming interface before expiration of the validity end time for verifying a validity of the protected device based upon the code within the message matching the code within the SMS message.

19. The non-transitory computer-readable medium of claim 18, wherein the operations comprise:
in response to receiving a rejection response for the message, transmitting a request to the platform for a new code.

20. The non-transitory computer-readable medium of claim 18, wherein the operations comprise:
facilitating, by the protected device, communication with the registered device based upon the validity of the protected device being verified.

* * * * *